United States Patent
Kothapalli et al.

(10) Patent No.: US 9,065,855 B2
(45) Date of Patent: Jun. 23, 2015

(54) SYSTEMS AND METHODS FOR AUTOMATICALLY PROVIDING WHOIS SERVICE TO TOP LEVEL DOMAINS

(75) Inventors: Malini Kothapalli, Centreville, VA (US); Jeffrey Warrington, Great Falls, VA (US)

(73) Assignee: VERISIGN, INC., Reston, VA (US)

( * ) Notice: Subject to any disclaimer, the term of this patent is extended or adjusted under 35 U.S.C. 154(b) by 348 days.

(21) Appl. No.: 13/539,111

(22) Filed: Jun. 29, 2012

(65) Prior Publication Data

US 2014/0006439 A1 Jan. 2, 2014

(51) Int. Cl.
*G06F 17/30* (2006.01)
*H04L 29/12* (2006.01)

(52) U.S. Cl.
CPC ............ *H04L 61/20* (2013.01); *H04L 61/1511* (2013.01); *G06F 17/30424* (2013.01); *H04L 61/1552* (2013.01); *H04L 61/302* (2013.01); *H04L 61/6063* (2013.01); *H04L 61/35* (2013.01)

(58) Field of Classification Search
None
See application file for complete search history.

(56) References Cited

U.S. PATENT DOCUMENTS

| | | | |
|---|---|---|---|
| 6,895,430 B1 | 5/2005 | Schneider |
| 6,901,436 B1 | 5/2005 | Schneider |
| 6,973,505 B1 | 12/2005 | Schneider |
| 7,188,138 B1 | 3/2007 | Schneider |
| 7,194,552 B1 | 3/2007 | Schneider |
| 7,565,402 B2 | 7/2009 | Schneider |
| 7,680,903 B2 | 3/2010 | Scheering |
| 7,752,260 B2 | 7/2010 | King et al. |
| 7,761,583 B2 | 7/2010 | Shull et al. |
| 7,921,063 B1 | 4/2011 | Quinlan |
| 7,992,204 B2 | 8/2011 | Shraim et al. |
| 8,037,168 B2 | 10/2011 | Schneider |
| 8,090,693 B2 | 1/2012 | Monroe |
| 8,224,994 B1 | 7/2012 | Schneider |
| RE43,690 E | 9/2012 | Schneider et al. |
| RE44,207 E | 5/2013 | Schneider |
| 8,458,161 B2 | 6/2013 | Schneider |
| 8,612,565 B2 | 12/2013 | Schneider |
| 8,635,340 B1 | 1/2014 | Schneider |

(Continued)

OTHER PUBLICATIONS

Team Cymru, Incident Response Guide to the Kaminsky DNS Cache Poison Exploit, Fall, 2008, pp. 1-25.

(Continued)

*Primary Examiner* — Dung K Chau
(74) *Attorney, Agent, or Firm* — MH2 Technology Law Group, LLP

(57) ABSTRACT

Methods and systems are disclosed for quickly providing Whois services to a new top level domain after it is provisioned in a registry. In one embodiment, domain data is received at a first system regarding a top level domain (TLD). The domain data is assigned an authoritative port of a Whois server and is provisioned in a registry database. In certain embodiments, the Whois server provides information relating to domain name registrations of the TLD in the database, according to the authoritative port. The Whois server determines that a Whois query is received at the authoritative port for the queried TLD and responds with the queried information. To the requester, the responses appear as if they are sent from a unique Whois server for each TLD, but the Whois server is actually shared among the TLDs.

26 Claims, 8 Drawing Sheets

(56) References Cited

U.S. PATENT DOCUMENTS

| | | |
|---|---|---|
| 2004/0199493 A1 | 10/2004 | Ruiz et al. |
| 2005/0203875 A1 | 9/2005 | Mohammed et al. |
| 2006/0218289 A1* | 9/2006 | Assad .................. 709/229 |
| 2007/0130316 A1 | 6/2007 | Turakhia |
| 2008/0016233 A1 | 1/2008 | Schneider |
| 2008/0059607 A1 | 3/2008 | Schneider |
| 2008/0307085 A1* | 12/2008 | Curran et al. ............ 709/223 |
| 2009/0064330 A1* | 3/2009 | Shraim et al. ............ 726/22 |
| 2009/0119402 A1 | 5/2009 | Shull et al. |
| 2010/0042622 A1 | 2/2010 | Matkowsky |
| 2010/0106650 A1 | 4/2010 | Adelman et al. |
| 2010/0153535 A1* | 6/2010 | Thayer et al. ............ 709/223 |
| 2010/0217690 A1* | 8/2010 | Lee et al. ................. 705/27 |
| 2011/0055249 A1* | 3/2011 | Consuegra et al. ........ 707/769 |
| 2011/0055911 A1* | 3/2011 | Adelman et al. ............ 726/7 |
| 2011/0252059 A1* | 10/2011 | Schneider ................. 707/770 |
| 2012/0102016 A1 | 4/2012 | Balogh |
| 2013/0085932 A1 | 4/2013 | Waldron et al. |
| 2013/0086636 A1 | 4/2013 | Golovanov |
| 2013/0173497 A1 | 7/2013 | Gould et al. |
| 2014/0006642 A1 | 1/2014 | Kothapalli et al. |

OTHER PUBLICATIONS

Dennis S. Prahl et al., The New Generic Top-Level Domain Program: A New Era of Risk for Trademark Owners and the Internet, The Trademark Reporter, Nov.-Dec. 2011, vol. 101, No. 6, pp. 1757-1800.

Partial European Search Report dated Oct. 30, 2013 from European Patent Application No. 13173529.2 filed Jun. 25, 2013, pp. 1-5.

Non-Final Office Action dated May 6, 2013, U.S. Appl. No. 13/746,579, filed Jan. 22, 2013, pp. 1-24.

Non-Final Office Action dated Nov. 21, 2013, U.S. Appl. No. 13/746,579, filed Jan. 22, 2013, pp. 1-21.

Sheng, S. et al. A RESTful Web Service for Domain Name Registration Data (RWS-DNRD); draft-sheng-weirds-icann-rws-dnrd-01. Internet Engineering Task Force, Internet Society (ISOC), Mar. 2012, pp. 1-17.

Extended European Search Report dated Jan. 3, 2014, issued in related European Patent Application No. 13173529.2 filed Jun. 25, 2013, pp. 1-9.

* cited by examiner

| TLD | Port | Address | IsPersonalDataPublic |
|---|---|---|---|
| .ibm | 1943 | 10.175.151.114 | True |
| .microsoft | 1944 | 10.175.151.114 | True |
| .africa | 1945 | 10.175.151.115 | False |

FIG. 3

SYSTEMS AND METHODS FOR AUTOMATICALLY PROVIDING WHOIS SERVICE TO TOP LEVEL DOMAINS

TECHNICAL FIELD

The present disclosure relates to the field of domain name registrations, and more particularly, to systems and methods for automatically providing a Whois service for newly created generic top level domains (TLDs).

BACKGROUND OF THE DISCLOSURE

The Domain Name System (DNS) allows people using the Internet to refer to domain names, rather than Internet Protocol (IP) addresses, when accessing websites and other online services. Domain names, which employ text characters, such as letters, numbers, and hyphens (e.g., "www.example.com"), will often be easier to remember than IP addresses, which are numerical and do not contain letters or hyphens (e.g., "128.1.0.0"). The DNS is the Internet's hierarchical lookup service for mapping character-based domain names meaningful to humans into numerical IP addresses.

Domains exist at various different "levels" within the DNS hierarchy. For example, a generic top level domain (gTLD), such as .COM or .NET, is a domain at the highest level in the DNS hierarchy. Another type of TLD is a country-code top level domain (ccTLD) such as, for example, .UK. A second-level domain (SLD) is a subdomain of a TLD (including gTLD and ccTLD), which is directly below the TLD in the DNS hierarchy. For example, .COM is the TLD and EXAMPLE is the SLD for the domain name "www.example.com."

Registries manage the domain names of each TLD. For example, Verisign is a well-known registry, and it manages the .COM and .NET TLDs. To maintain a domain name in accordance with current regulations mandated by Internet Corporation for Assigned Names and Numbers (ICANN), the registry responsible for a TLD is required to maintain a certain minimum amount of information associated with the domain name to ensure proper identification, security features, and operability associated with the domain name. For example, all domain registrants are required to make available to the registry or the registrar their current administrative contact information. Also, in order for a domain name to work correctly, the registry must have nameserver information for the domain name to load into the registry's TLD DNS system to refer outside DNS requests to the proper authoritative DNS servers. Other information could include the registrar through which the domain name's registration took place, the registration date, the expiration date, and the status of the domain name.

Domain name registration is the process by which a "registrant" (typically an individual user or an organization) can reserve or lease the use of a domain name for a specified period of time from the date of registration. The registrant may reserve the domain name for at least one year but may reserve the domain name for up to ten years. Domain names are reserved through domain "registrars." Registrars are entities having business relationships with domain "registries," which control the domain names and maintain a domain name database for a particular TLD. Thus, a registrar provides the interface by which a registrant can reserve or lease a domain name from a registry. The registry manages the reserved names and available names for a particular TLD and makes available certain information to the registrar through the Extensible Provisioning Protocol (EPP). Registrars that are authorized by the registry have the ability to make reservations and check the status of domain names through the EPP. The registry provides the EPP as a communications gateway to Registrars for such purposes.

In a typical domain name registration example, a registrant may want to reserve the domain name "example.com." The registrant would contact a registrar that has a business relationship with the registry that operates the .COM TLD. For example, the company GoDaddy is a known registrar, and the company Verisign is a known registry. The registrant would query the registrar as to the availability of the domain name "example" in the .COM namespace. The registrar in turn would query the proper Registry for the .COM TLD through the EPP, and then return the results to the registrant. The Registrant may then obtain a registration of the domain name by paying a registration fee and providing information required by the registry and registrar. The registry charges the registrar for the domain name registration and the registrar collects the registration fee from the registrant.

In addition to the traditional TLDs (e.g., .COM and .NET), the domain name system and domain name registration system have also evolved to allow the use of new generic TLDs (gTLDs), which may be applied for from the regulatory body pertaining to registries and registrars, the Internet Corporation for Assigned Names and Numbers (ICANN). Some of these gTLDs are often referred to as "vanity" or "brand" domains, such as .MICROSOFT or .COCACOLA. ICANN also allows for "community-based" TLDs, such as .BANK or .HOTEL, and "geographic" TLDs, such as .AFRICA. Other TLDs may be contemplated by ICANN.

The creation and administration of a new TLD requires several changes to be made at a registry, at one or more registrars, and at a variety of other services, such as Whois. The Whois server typically stores and provides domain registration information, such as registration date, expiration date, status, and owner of the registered domain names. The Whois server provides a service that can be queried by users via, for example, a website on the Internet provided by a registrar or registry or via standard Telnet-like clients. With ICANN's new gTLD program for new gTLDs, hundreds of new gTLDS are expected to be created over the next few years. Registries for the new gTLDs must provide Whois services for all of them. However, creating a separate Whois service for each new gTLD is cost prohibitive and does not scale.

Thus, there exists a need in the art to automatically provide a Whois service upon the creation and provisioning of a new TLD with minimal manual intervention from registry administrative users.

SUMMARY

In accordance with an embodiment, a method for establishing a top level domain may be provided. The method may comprise receiving domain data related to a top level domain (TLD) at a first computer system. The domain data may be assigned a network address of a second computer system. The domain data may be transmitted to the second computer system. The domain data may be stored in a database of the second computer system. In another embodiment, a system for establishing a top level domain may be provided.

In another embodiment, a method for processing a Whois query may be provided. The method may comprise receiving a query at a first network address of a server. The query may include a request for an object relating to a domain name in a TLD. The method may also comprise determining a preassigned network address that corresponds to the TLD. The preassigned network address may be compared to the first network address of the server. The object may be searched for in a database.

In other embodiments, the method may include verifying that the first network address corresponds to the preassigned network address. The method may also comprise returning a response to the query containing the object.

In another embodiment, a system for processing a Whois query may be provided.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

FIG. 3 illustrates an exemplary database of information for providing Whois services to TLDs using the disclosed embodiments.

DETAILED DESCRIPTION

Reference will now be made in detail to the disclosed embodiments, certain examples of which are illustrated in the accompanying drawings. One of ordinary skill in the art will recognize that the disclosed embodiments can be modified in various respects, all without departing from the spirit and scope of this disclosure. Accordingly, the drawings and descriptions are to be regarded as illustrative in nature, and not as restrictive. Wherever convenient, the same reference numbers will be used throughout the drawings to refer to the same or like parts.

Figure 1:
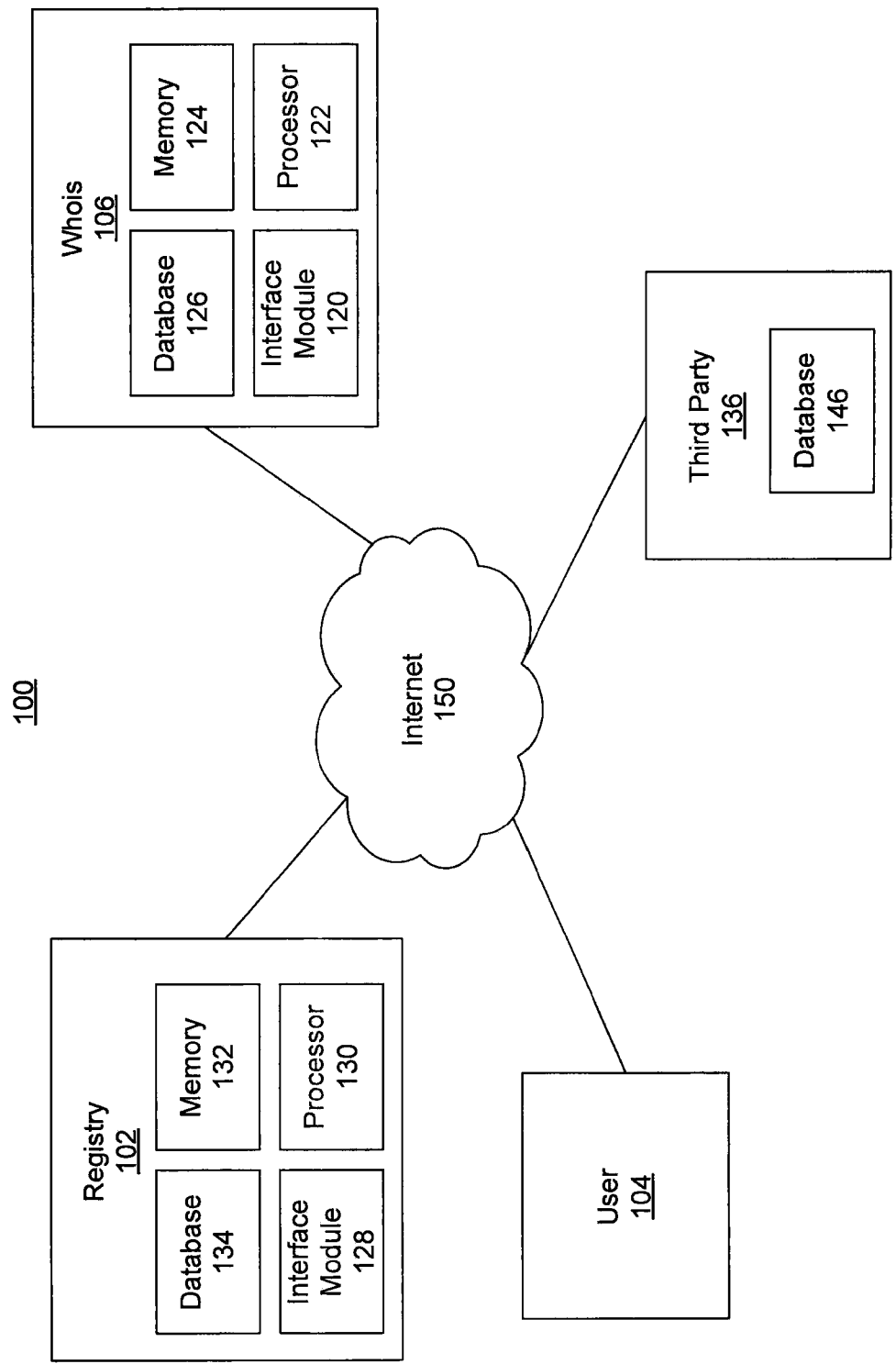
FIG. 1 illustrates an exemplary system for providing Whois services to TLDs using the disclosed embodiments.

FIG. 1 illustrates a diagram providing an example of a system 100 for serving a new top level domain (TLD), consistent with the disclosed embodiments. In this example, a registry 102, a user 104, a Whois service 106, and a third-party 136 may be connected to a network, such as Internet 150. In certain embodiments, the network may be any type of communication network configured to transmit information between the devices of system 100. For example, the network may include a wireless and/or wireline network components (e.g., hardware, software, and/or firmware) configured to receive, route, translate, and deliver information. The network may also include an extranet, an Intranet, a Local Area Network, etc. and infrastructure that communicates information over these types of networks, such as wireless/wireline base stations, transceivers, and related technology.

Registry 102 may be an entity that manages a new TLD. Registry 102 may include infrastructure to define and provision new TLDs, including, for example, computer components (e.g., servers, processors, memory devices storing software instructions that when executed by processor(s) execute provisioning-related processes, communication components, and the like). Registry 102 may include one or more processors 130 and memory devices (memory) 132 storing software instructions that, when executed by processors 130, perform one or more operations consistent with the disclosed embodiments. Registry 102 may include an interface module 128, such as a graphical user interface, to allow registry 102 to manage TLDs.

Whois server 106 may provide a service accessible by registry 102 for responding to Whois queries. Whois server 106 may be one or more computers configured to receive requests for information over a network (e.g., Internet 150) and provide information to components over the network. For example, in one embodiment, Whois server 106 may include one or more computer or data processing devices that have hardware (e.g., processors, storage memory, data buses, network interface, etc.) and/or software (e.g., application programs, operating systems, other executable program code written in any known programming languages). Whois server 106 may include one or more processors 122 and memory devices (memory) 124 storing software instructions that, when executed by processors 122, perform one or more operations consistent with the disclosed embodiments. Whois server 106 may include an interface module 120, such as a web interface, to allow registry 102, user 104, or third party 136 to query for information relating to the TLDs that Whois server 106 serves. Interface module 120 may also include a password-protected web interface that would restrict querying Whois server 106 to individuals or entities with valid identification information, as discussed below for FIG. 7. Whois server 106 may also store a list of pre-authorized sources for restricting queries to the Whois service, as discussed below for FIG. 8. Whois server 106 may also include one or more databases 126 for storing information relating to TLDs.

In one embodiment, Whois server 106 may be associated with registry 102. For example, Whois server 106 may be associated with a Whois service provider that provides the service for registry 102. In another embodiment, Whois service 106 may be part of registry 102. In other embodiments, Whois server 106 may provide Whois services for multiple entities that manage TLDs, including registry 102 and third party 136. For example, third party 136 may be a corporation, partnership, company, or other business entity that manages a new gTLD, such as .MICROSOFT.

User 104 may be an individual accessing Whois server 106 via, for example, a website on the Internet 150 or via Whois server 106's interface 120. Alternatively, user 104 may be a registrar or other corporation, partnership, company, government agency, municipality, or other forms of business or government entities that accesses Whois server 106.

System 100, or one or more components of system 100, may be configured to execute processes that provide Whois services relating to TLDs defined and provisioned by registry 102.

Figure 2:
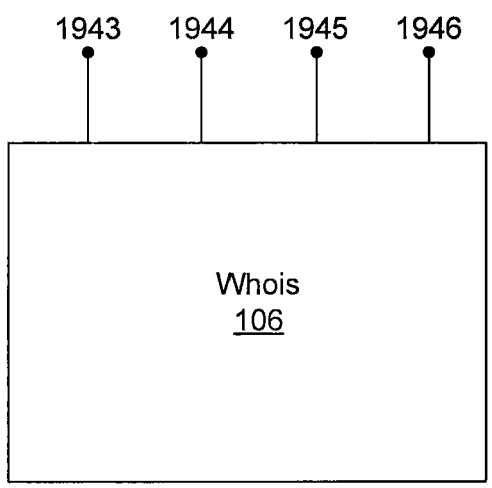
FIG. 2 illustrates an exemplary sub-system for providing Whois services to TLDs using the disclosed embodiments.

FIG. 2 illustrates a diagram providing an example of Whois server 106 for processing Whois queries relating to TLDs, consistent with the disclosed embodiments. Whois server 106 may include one or more ports, such as ports 1943, 1944, 1945, and 1946, which receive queries from user 104 via the Internet 150. Each port may be associated with a TLD when the TLD is created and provisioned by registry 102. If a port is assigned to a TLD, it may serve as that TLD's authoritative port. Each port may be assigned (or "mapped") to, and therefore authoritative for, multiple TLDs at once.

FIG. 3 illustrates a table providing an example of the port and network address mappings in Whois server 106 for processing Whois queries relating to a set of TLDs, consistent with the disclosed embodiments. In one embodiment, ports may be used to map TLDs to Whois server 106 for carrying out the disclosed methods. In other embodiments, other network addresses may be used, such as IP addresses or HTTP addresses. The table of FIG. 3 illustrates that the TLD .IBM may be associated with port 1943. Port 1943 is therefore the authoritative port for .IBM, but may serve as the authoritative port for other TLDs. The table further illustrates that the TLD .MICROSOFT may be associated with port 1944. Port 1944 is therefore the authoritative port for .MICROSOFT, but may serve as the authoritative port for other TLDs. The table finally illustrates that the TLD .AFRICA may be associated with port 1945, making port 1945 the authoritative port for the .AFRICA TLD. While the embodiments discussed herein pertain to port mappings, the disclosure is not so limited and may include mapping to other network addresses, such as IP addresses or HTTP addresses.

The table further illustrates that each TLD may be associated with a network address. In one embodiment, the network address may include IP addresses 10.175.151.114 for .IBM and .MICROSOFT and 10.175.151.115 for .AFRICA. Other network address protocols may be used, such as HTTP.

FIG. 3 further illustrates that domain features defined by registry 102 or third party 136 when creating a new TLD may include an identifier indicating whether personal contact information of domain name registrants will be public or private. In one embodiment, a subset of TLDs may keep more personal contact information private, such as registrants' addresses and telephone numbers, than other TLDs. For example, the TLDs may include an identifier of "True" or "False" indicating whether personal data of registrants will be shared. When a Whois query is received relating to a domain name of a TLD with the identifier marked "False," the response to the query may include information such as the domain name, the nameserver, the registrar, the registration date, the expiration date, and the status of the domain name. However, when a Whois query is received for a domain name of a TLD with the identifier marked "True," the response may include any of the above features, and may also include the registrant's name, address, or other identifying contact information. In other embodiments, different methods may be used for indicating whether the personal contact information is allowed to be shared for a particular TLD, such as indicating whether the TLD is "thick" or "thin."

Thus, in the example of FIG. 3, if Whois server 106 receives a query for "example.africa," it may not provide to user 104 a response that includes contact information regarding the registrant. If Whois server 106, however, receives a query for "example.ibm" or "example.microsoft," it may provide the registrant's contact information to user 104 because .IBM and .MICROSOFT may allow Whois server 106 to publically share personal contact information. In other embodiments, Whois server 106 may act as a premium Whois service and may provide contact information if user 104 has valid identification information using a password-protected web interface or is a preauthorized source, as discussed below as to FIGS. 7-8.

Figure 4:
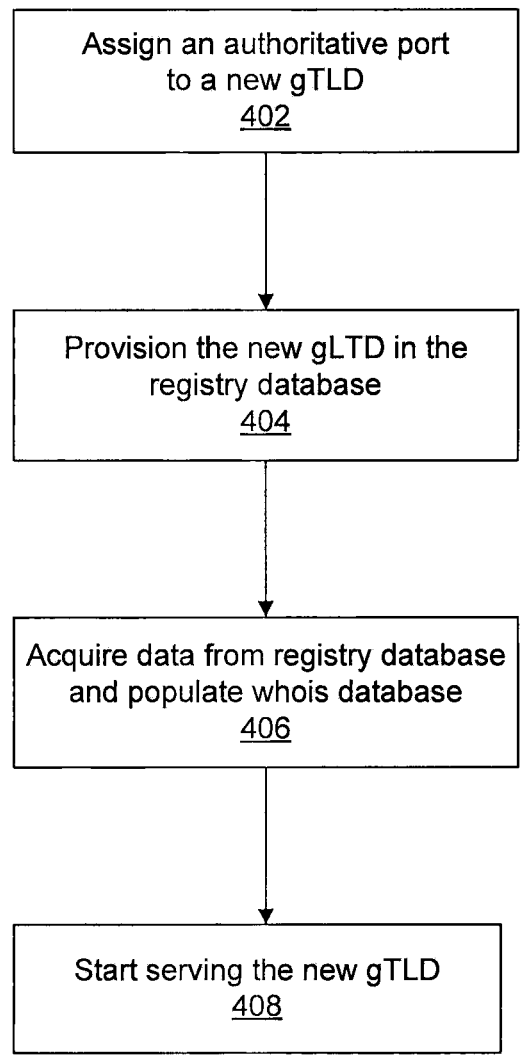
FIG. 4 illustrates an exemplary method for providing Whois services to a TLD, consistent with the disclosed embodiments.

FIG. 4 is a flowchart an exemplary method 400 for providing Whois services to a TLD, consistent with the disclosed embodiments. In one embodiment, the Whois service may be provided by Whois server 106 (FIG. 1). In step 402, registry 102 or third party 136 assigns, to a new TLD, an authoritative port in Whois server 106. For example, registry 102 may assign port 1944 to .MICROSOFT (FIGS. 2-3). Alternatively, third party 136 may request registry 102 to assign a unique Whois service to a port that is not shared with other TLDs. In this embodiment, registry 102 may allocate a separate port to that TLD, which may provide a unique Whois service to that TLD. In one embodiment, for example, registry 102 may assign port 1945 to .AFRICA if third party 136 manages the .AFRICA TLD. In other embodiments, registry 102 may assign an authoritative port in Whois server 106 to an existing TLD. For example, registry 102 may assign port 1945 (FIG. 2) to the .COM TLD.

In step 404, registry 102 may provision the TLD in one or more registry databases 134. In one embodiment, provisioning may include at least setting up a DNS service and the Whois service for the TLD. Setting up the Whois service may include assigning a default port of Whois server 106 to the TLD, such as port 1943. Thus, a TLD may be provisioned without being assigned an authoritative port. In other embodiments, provisioning may include at least adding the TLD to one or more registry databases 134 and allowing registrars to transact with registry 102 for that TLD. For example, registry 102 may have multiple databases supporting multiple TLDs. In one embodiment, registry 102 may have three databases, one supporting gTLDs, one supporting ccTLDs, and one supporting vanity TLDs. Each database may support more than one TLD. In other embodiments, third party 136 may provision the TLD in one or more databases 146.

In step 406, Whois server 106 may acquire data regarding the TLD from registry database 134 or third party database 146 and store it in database 126 of Whois server 106. For example, Whois server 106 may extract the TLD, its authoritative port, and its network address, and use that information to populate database 126. In one embodiment, Whois server 106 may replicate the data in registry database 134 in database 126. For example, Whois server 106 may copy the data stored in the table in FIG. 3 from registry database 134 to database 126. In other embodiments, registry 102 or third party 136 may push data to database 126 of Whois server 106.

In step 408, Whois server 106 may begin to serve the new gTLD with the Whois service. For example, in step 410, Whois server 106 processes queries received for domain name registrations of the new gTLD, according to the methods described below (FIGS. 5-8).

Figure 5:
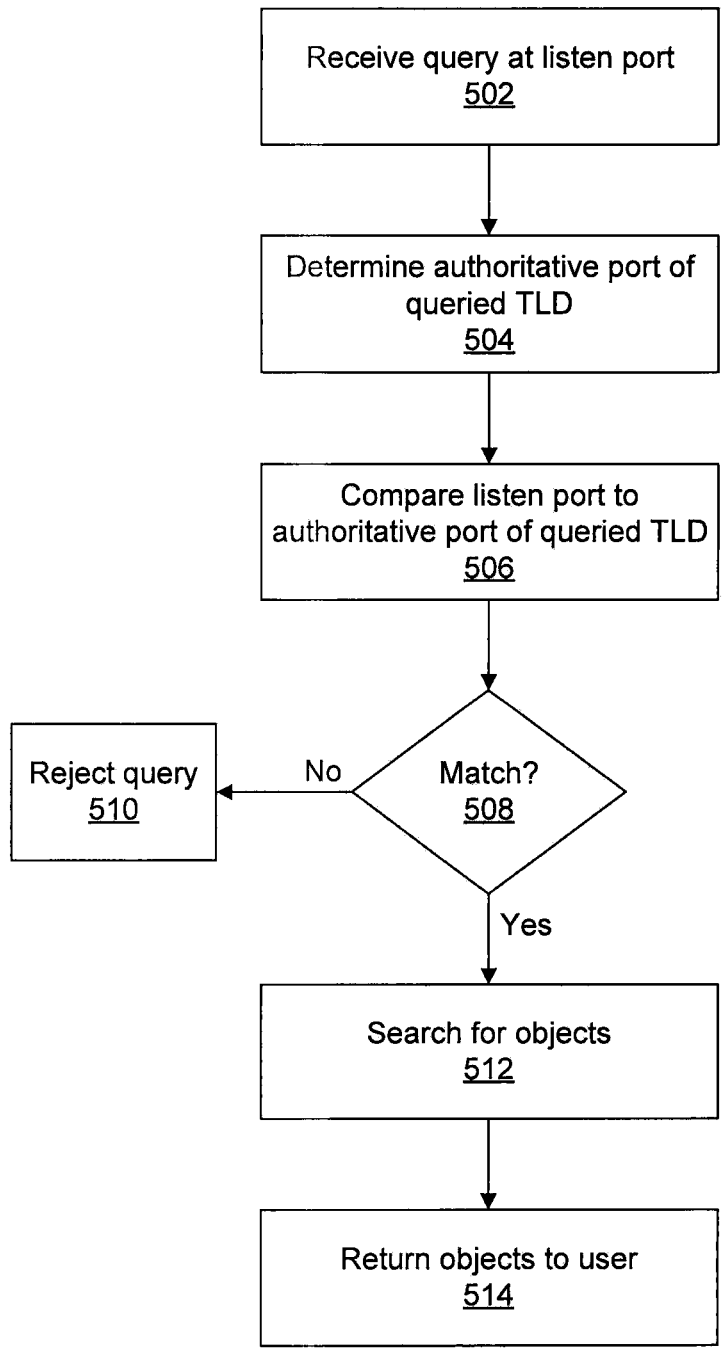
FIG. 5 illustrates an exemplary method for responding to Whois queries, consistent with the disclosed embodiments.

FIG. 5 is a flowchart for an exemplary method 500 for responding to Whois queries, consistent with the disclosed embodiments. In step 502, Whois server 106 may receive a query from user 104 at one of ports 1943, 1944, 1945, or 1946 (FIG. 2). For example, user 104 may access the Whois service provided by Whois server 106 via the Internet 150 or via Whois interface 120 and may query for "example.microsoft" at port 1943. In step 504, Whois server 106 may evaluate the query to determine which port is authoritative for the queried TLD. In this example, Whois server 106 may determine that, according to the data stored in database 126, port 1944 is the authoritative port for the queried TLD .MICROSOFT (FIG. 3).

In step 506, Whois server 106 may compare the port receiving the query (e.g., 1943) to the authoritative port (e.g., 1944). Whois server 106 may determine whether the two ports match in step 508. If they do not match, Whois server 106 may reject the query in step 510. Rejecting the query may include sending a response to user 104 indicating that the query is rejected.

For example, the response may include a message, such as "No Match Found," even though the queried information may exist in database 126.

If the ports do match, Whois server 106 may search database 126 for the queried information (step 512). For example, if user 104 queried for "example.microsoft" at port 1944 (FIG. 3), in step 512 Whois server 106 may search for the queried information in database 126. For example, user 104 may request, and Whois server 106 may search for, objects relating to the queried TLD, such as the domain name, the nameserver, the registrar, the registration date, the expiration date, and the status of the domain name. Whois server 106 may also search for other objects, such as registrant's personal contact information.

In step 514, Whois server 106 may return the objects of the query to user 104. In one embodiment, Whois server 106 may return objects associated only with the authoritative TLD. For example, if user 104 queries for the registration date of "example.microsoft" at port 1944 (FIG. 3), Whois server 106 may return information relating only to the .MICROSOFT TLD. In contrast, if user 104 queries for the registration date of "example.microsoft" at port 1943, Whois server 106 may not return any information regarding the .MICROSOFT TLD (step 510).

In other embodiments, the objects returned in the response may depend on whether Whois server 106 is allowed to disclose personal contact information for the queried TLD. For example, as illustrated in FIG. 3, Whois server 106 may be allowed to publically disclose personal contact information of registrants of the .MICROSOFT TLD. As a result, in FIG. 5, if user 104 queried Whois server 106 for the name and address of the registrant of "example.microsoft," Whois server 106 may provide (step 514) a response to user 104 with the requested objects (i.e., the registrant's name and address). If, however, user 104 queried Whois server 106 for the name and address of the registrant of "example.africa" (FIG. 3), Whois server 106 may not provide the requested objects in a response to user 104. Whois server 106 may, however, return other objects in response to user 104's query regarding "example.africa," such as the nameserver, the registrar, the registration date, the expiration date, and the status of the domain name.

Figure 6:
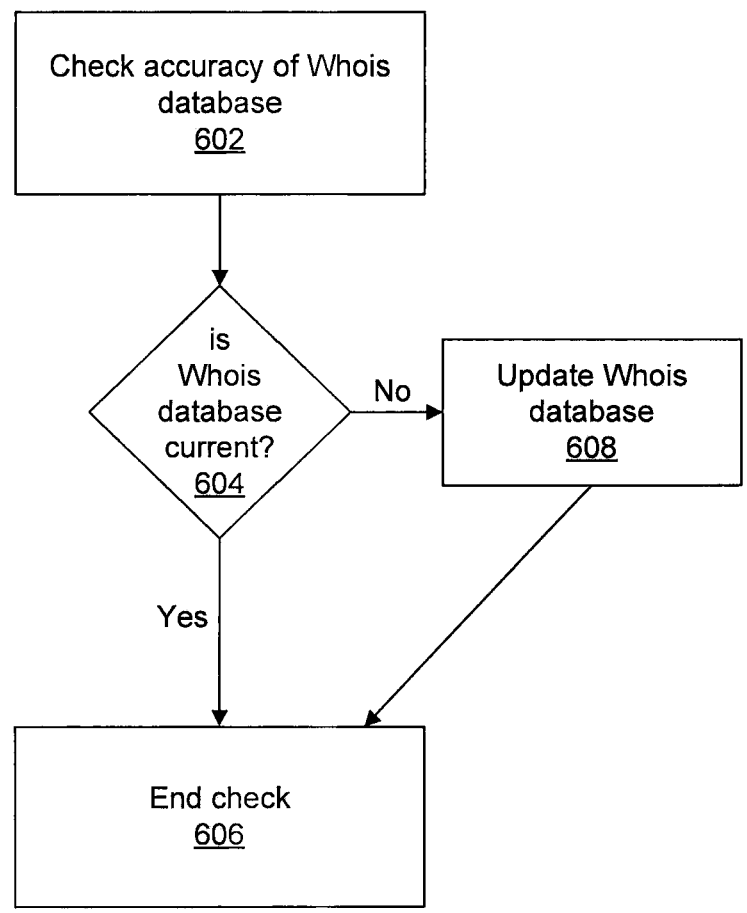
FIG. 6 illustrates an exemplary method for updating information in a database for providing Whois services to a TLD, consistent with the disclosed embodiments.

FIG. 6 is a flowchart of an exemplary method 600 for updating the Whois data for providing Whois services to a TLD, consistent with the disclosed embodiments. In step 602, Whois server 106 may perform an accuracy check of the information in database 126. In one embodiment, Whois server 106 may perform an accuracy check of the information in database 126 based on a predetermined duration, such as every 10 seconds. Other durations may be used. In step 604, Whois server 106 may determine whether the Whois data in database 126 is current.

If the information is current, in step 606, Whois server 106 may end the process. If the information is not current, in step 608, Whois server 106 may determine that the data in database 126 needs to be updated. In one embodiment, Whois server 106 may update database 126 with the current information. For example, Whois server 106 may update the port mapping of a particular TLD if the authoritative port has changed. In other embodiments, Whois server 106 may update database 126 with information stored in other databases, such as registry database 134. For example, Whois server 106 may determine that registry 102 has assigned a new authoritative port, port 1946, to the .MICROSOFT TLD, instead of port 1944 (FIGS. 2-3). In this example, Whois server 106 may update its port mappings in database 126 to reflect that .MICROSOFT is now served by port 1946. Whois server may then end the accuracy check process in step 606.

Figure 7:
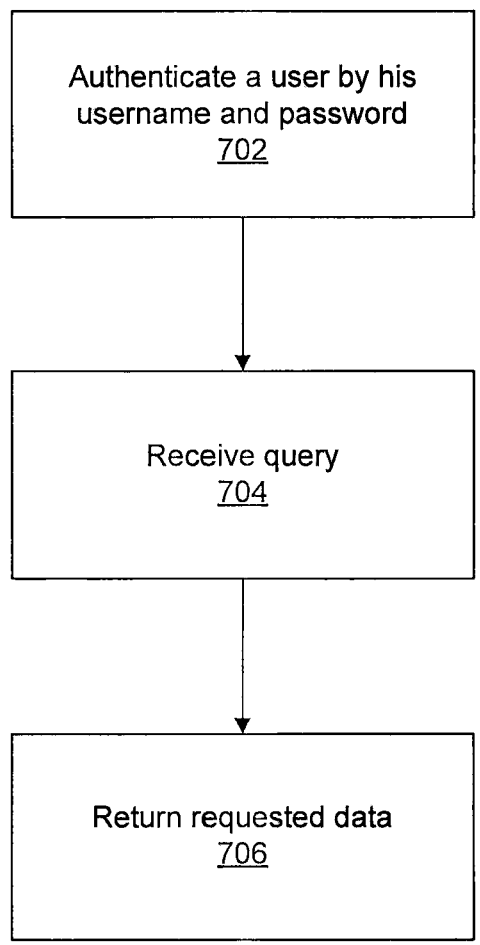
FIG. 7 illustrates an exemplary method for providing a premium Whois service, consistent with the disclosed embodiments.

FIG. 7 is a flowchart of an exemplary method 700 for providing a premium Whois service to authorized personnel, consistent with the disclosed embodiments. In step 702, Whois server 106 may authenticate user 104's username and password using, for example, a password-protected web interface. Whois interface module 120 (FIG. 1) may include a password-protected web interface. In FIG. 7, user 104 may, in one embodiment, access a website provided by registry 102 and may provide user credentials, like a user name and password. Whois server 106 may validate the credentials to determine whether user 104 is authorized to receive sensitive information. For example, registry 102 may only authorize legal or law enforcement entities to access sensitive information related to a TLD. Sensitive information may include personal contact information of registrants, such as name, phone number, e-mail address, fax number, physical address, and the like.

In step 704, Whois server 106 may receive a Whois query from user 104 whose user credentials have been authenticated. In step 706, Whois server 106 may return to user 104 the requested sensitive information.

Figure 8:
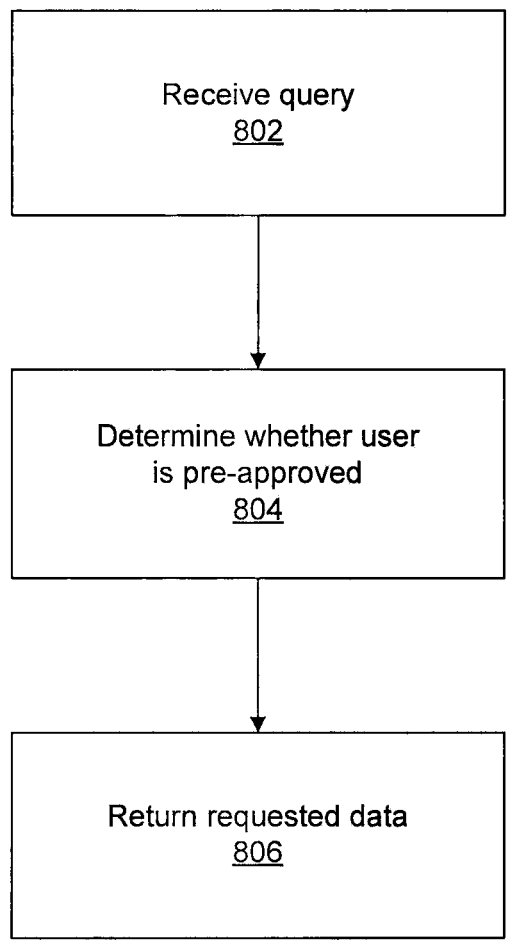
FIG. 8 illustrates another exemplary method for providing a premium Whois service, consistent with the disclosed embodiments.

FIG. 8 is a flowchart of another exemplary method 800 for providing a premium Whois service to authorized personnel, consistent with the disclosed embodiments. In step 802, Whois server 106 may receive a Whois query from user 104. In step 804, Whois server 106 may determine that user 104 is on a list of pre-authorized personnel stored in a database, such as database 126. In one embodiment, Whois server 106 may determine that user 104's network address is pre-approved. For example, Whois server 106 may store the source IP addresses of the pre-authorized personnel in a database, such as database 126. Whois server 106 may determine that user 104's source IP address corresponds to that of a pre-authorized person's IP address. In step 806, Whois server 106 may return to user 104 the requested sensitive information.

It is intended that the specification and examples be considered as exemplary only, with the true scope and spirit being indicated by the following claims.

The invention claimed is:

1. A computer-implemented method for establishing top level domains, comprising:
    receiving, at a first computer system, a first domain data associated with a first top level domain and a second domain data associated with a second top level domain;
    associating a first network address corresponding to a second computer system to the first top level domain and a second network address corresponding to the second computer system to the second top level domain;
    updating the first to level domain, wherein the updating comprises transmitting the first domain data to the second computer system, whereby the second computer system:
        compares the first domain data to stored domain data in the second computer system; and
        updates the stored domain data in the second computer system with the first domain data, based on the comparing;
    provisioning the second top level domain, wherein the provisioning comprises transmitting the second domain data to the second computer system, whereby the second computer system initiates a second registration data lookup service for the second top level domain using the second domain data; and
    initiating assignment of the first network address as an authoritative network address for the first top level domain and the second network address as an authoritative network address for the second top level domain.

2. The method of claim 1, wherein the first computer system comprises a system of a registry.

3. The method of claim 1, wherein the second computer system comprises a Whois system.

4. The method of claim 1, wherein transmitting comprises extracting the first domain data and the second domain data from the first computer system.

5. The method of claim 1, further comprising:
receiving a domain name registration for the first top level domain, the domain name registration including domain name data; and
transmitting the domain name data to the second computer system.

6. The method of claim 1, wherein the second computer system:
provides a response to a query regarding the first top level domain.

7. The method of claim 1, wherein the first network address and the second network address comprise at least one of a port number, an internet protocol address, or a hypertext transfer protocol address.

8. A system for establishing top level domains, comprising:
a processor; and
a memory storing instructions which, when executed on the processor, cause the system to:
receive, at a first computer system, a first domain data associated with a first top level domain and a second domain data associated with a second top level domain;
associate a first network address corresponding to a second computer system to the first top level domain and a second network address corresponding to the second computer system to the second top level domain;
updating the first to level domain, wherein the updating comprises transmitting the first domain data to the second computer system, whereby the second computer system:
compares the first domain data to stored domain data in the second computer system; and
updates the stored domain data in the second computer system with the first domain data, based on the comparing;
provisioning the second top level domain, wherein the provisioning comprises transmitting the second domain data to the second computer system, whereby the second computer system initiates a second registration data lookup service for the second top level domain using the second domain data; and
initiating assignment of the first network address as an authoritative network address for the first top level domain and the second network address as an authoritative network address for the second top level domain.

9. The system of claim 8, wherein the first computer system comprises a system of a registry.

10. The system of claim 8, wherein the second computer system comprises a Whois system.

11. The system of claim 8, wherein transmitting comprises extracting the first domain data and the second domain data from the first computer system.

12. The system of claim 8, wherein the memory further contains instructions which, when executed by the processor, cause the system to:

receive a domain name registration for the first top level domain, the domain name registration including domain name data; and
transmit the domain name data to the second computer system.

13. The system of claim 8, wherein the second computer system:
provides a response to a query regarding the first top level domain.

14. The system of claim 8, wherein the first network address and the second network address comprise at least one of a port number, an internet protocol address, or a hypertext transfer protocol address.

15. A computer-implemented method for processing a Whois query, comprising:
receiving a first query via a first network address of a server and a second query via a second network address of the server, the first query comprising a request for a first object relating to a domain name in a first top level domain and the second query comprising a request for a second object relating to a domain name in a second top level domain;
determining that a source of the first query is not authorized based on the first network address;
returning a response to the first query without the first object, the response including information that is allowed to be disclosed;
comparing the second network address with a preassigned network address corresponding to the second top level domain; and
searching a database for the second object in response to the comparing.

16. The method of claim 15, further comprising:
rejecting the first query if the first network address does not correspond to the preassigned network address corresponding to the first top level domain.

17. The method of claim 15, further comprising:
verifying that the first network address corresponds to the preassigned network address corresponding to the first top level domain; and
returning a response to the first query containing the first object.

18. The method of claim 15, further comprising:
determining that the first object is allowed to be disclosed; and
returning a response to the first query containing the first object.

19. The method of claim 15, further comprising:
determining that a source of the first query is authorized; and
returning a response to the first query containing the first object.

20. The method of claim 15, wherein the first network address and the preassigned network address corresponding to the first top level domain are one of a port number, an internet protocol address, or a hypertext transfer protocol address.

21. A system for processing a Whois query, comprising:
a processor; and
a memory storing instructions which, when executed by the processor, cause the system to:
receive a first query via a first network address and a second query via a second network address, the first query comprising a request for a first object relating to a domain name in a first top level domain and the second query comprising a request for a second object relating to a domain name in a second top level domain;

determining that a source of the first query is not authorized based on the first network address;

returning a response to the first query without the first object, the response including information that is allowed to be disclosed;

compare the second network address with a preassigned network address corresponding to the second top level domain; and search a database for the second object in response to the comparing.

22. The system of claim 21, wherein the memory further contains instructions which, when executed by the processor, cause the system to:

reject the first query if the first network address does not correspond to the preassigned network address corresponding to the first top level domain.

23. The system of claim 21, wherein the memory further contains instructions which, when executed by the processor, cause the system to:

verify that the first network address corresponds to the preassigned network address corresponding to the first top level domain; and return a response to the first query containing the first object.

24. The system of claim 21, wherein the memory further contains instructions which, when executed by the processor, cause the system to:

determine that the first object is allowed to be disclosed; and return a response to the first query containing the first object.

25. The system of claim 21, wherein the memory further contains instructions which, when executed by the processor, cause the system to:

determine that a source of the first query is authorized; and return a response to the first query containing the first object.

26. The system of claim 21, wherein the first network address and the preassigned network address corresponding to the first top level domain are one of a port number, an internet protocol address, or a hypertext transfer protocol address.

* * * * *